(12) United States Patent
Ryu et al.

(10) Patent No.: US 9,065,152 B2
(45) Date of Patent: Jun. 23, 2015

(54) SECONDARY BATTERY WITH AN IMPROVED SAFETY

(75) Inventors: Duk Hyun Ryu, Daejeon (KR); Soon Ho Ahn, Daejeon (KR); Han Ho Lee, Daejeon (KR); Jae Hyun Lee, Daejeon (KR); Min Chul Jang, Yongin-si (KR); Jun Yong Jeong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 894 days.

(21) Appl. No.: 10/563,537

(22) PCT Filed: Jul. 9, 2004

(86) PCT No.: PCT/KR2004/001691
§ 371 (c)(1),
(2), (4) Date: Dec. 29, 2005

(87) PCT Pub. No.: WO2005/006467
PCT Pub. Date: Jan. 20, 2005

(65) Prior Publication Data
US 2006/0159990 A1 Jul. 20, 2006

(30) Foreign Application Priority Data

Jul. 11, 2003 (KR) .................. 10-2003-0047261
Jul. 31, 2003 (KR) .................. 10-2003-0053060

(51) Int. Cl.
*H01M 2/04* (2006.01)
*H01M 10/42* (2006.01)
(Continued)

(52) U.S. Cl.
CPC ........ *H01M 10/4235* (2013.01); *H01M 2/0275* (2013.01); *H01M 2/0285* (2013.01);
(Continued)

(58) Field of Classification Search
CPC ............ H01M 10/052; H01M 2/0287; H01M 10/4235; H01M 10/0436; H01M 2/34; H01M 2/30; H01M 2/06; H01M 2/0285; H01M 2/0275
USPC .................................................. 429/176, 181
See application file for complete search history.

(56) References Cited

U.S. PATENT DOCUMENTS 4,997,732 A   3/1991  Austin et al. .................. 429/153
6,277,516 B1  8/2001  Sasaki et al.
(Continued)

FOREIGN PATENT DOCUMENTS

CN    1343614 C     4/2002
EP    0 390 557 A2  10/1990
(Continued)

OTHER PUBLICATIONS

Machine translation of JP 2002-230603, Yamashita Mastaka, Sep. 13, 2002.*
(Continued)

*Primary Examiner* — Gary Harris
(74) *Attorney, Agent, or Firm* — Birch, Stewart, Kolasch & Birch, LLP

(57) ABSTRACT

A secondary battery comprising a battery package which encloses the outer perimeter of the secondary battery and covers the entire outer surface of positive and negative electrodes and a portion of each terminal of the positive and negative electrodes, wherein the battery package is formed of a laminate film comprising an outer polymer layer, an inner aluminum layer and an adhesive layer formed on a portion of the inner surface of the aluminum layer, the aluminum layer of the battery package being electrically connected with either of the positive and negative is provided. Alternatively, at least one electrically conductive metal foil on at least one of the outer upper and lower surfaces of the battery package is provided.

15 Claims, 6 Drawing Sheets

(51) Int. Cl.
*H01M 2/02* (2006.01)
*H01M 2/06* (2006.01)
*H01M 2/30* (2006.01)
*H01M 2/34* (2006.01)
*H01M 10/04* (2006.01)
*H01M 10/052* (2010.01)

(52) U.S. Cl.
CPC .............. *H01M2/0287* (2013.01); *H01M 2/06* (2013.01); *H01M 2/30* (2013.01); *H01M 2/34* (2013.01); *H01M 10/0436* (2013.01); *H01M 10/052* (2013.01)

(56) References Cited

U.S. PATENT DOCUMENTS

| | | | |
|---|---|---|---|
| 6,387,566 B1 * | 5/2002 | Chang et al. | 429/161 |
| 6,509,123 B1 * | 1/2003 | Shibuya et al. | 429/303 |
| 6,673,488 B2 * | 1/2004 | Furusaki | 429/163 |
| 6,755,873 B2 * | 6/2004 | Mizutani et al. | 29/623.2 |
| 6,838,209 B2 * | 1/2005 | Langan et al. | 429/178 |
| 2002/0146621 A1 * | 10/2002 | Yageta et al. | 429/181 |
| 2003/0059673 A1 | 3/2003 | Langan et al. | |

FOREIGN PATENT DOCUMENTS

| | | |
|---|---|---|
| JP | 7-249403 | 9/1995 |
| JP | 11-111262 | 4/1999 |
| JP | 11-312514 A | 11/1999 |
| JP | 2000-353504 A | 12/2000 |
| JP | 2001-068161 A | 3/2001 |
| JP | 2001-297795 A | 10/2001 |
| JP | 2002-260603 | 9/2002 |
| JP | 2003-36824 A | 2/2003 |
| WO | 00/70701 | 11/2000 |
| WO | 0157941 | 8/2001 |

OTHER PUBLICATIONS

Chinese Office Action Dated Nov. 2, 2007 for Application No. 2004800199999.
Russian Office Action dated Nov. 26, 2006 for Application No. 2006104120/09.
PCT International Search Report; International Application No. PCT/KR2004/001691; International Filing date: Jul. 9, 2004; Date of Mailing: Oct. 14, 2004.
Japanese Office Action issued on May 19, 2008.
European Supplementary Search Report—European Patent Application No. EP04774101.2 dated Nov. 9, 2010.
Japanese Office Action for Japanese Application No. 2011-196272 dated Dec. 24, 2013.

* cited by examiner

SECONDARY BATTERY WITH AN IMPROVED SAFETY

TECHNICAL FIELD

The present invention relates to a secondary battery enclosed in a new battery package structure which provides an improvement in the safety of the battery. More particularly, the inventive package can be used in lithium secondary batteries, particularly lithium polymer batteries.

BACKGROUND ART

Recently, lithium secondary batteries using non-aqueous electrolyte are increasingly used as a power source for portable electronic devices due to high voltage, high capacity, high output and low weight. However, such lithium secondary batteries have a safety problem and thus attempts to solve this problem are being made. When lithium secondary battery is overcharged, excess lithium flows out from a positive electrode and is inserted into a negative electrode, while very highly reactive lithium metal is deposited on the negative electrode surface, and the positive electrode becomes thermally unstable. This results in rapid exothermic reactions due to the decomposition reaction of an organic solvent used as electrolyte, thus causing safety problems, such as battery fire and explosion.

Furthermore, when conductive materials, such as nails, penetrate the battery, the electrochemical energy within the battery is converted into thermal energy while generating heat rapidly. The generated heat causes rapid exothermic reactions by the chemical reaction of the positive or negative electrode materials, resulting in safety problems, such as battery fire and explosion.

Moreover, the nail penetration, compression, impact and high temperature exposure of the battery lead to a local short circuit within the positive and negative electrodes of the battery. At this time, excessive currents locally flow to generate heat. As the magnitude of a short circuit current caused by the local short circuit is inversely proportional to resistance, the short circuit current flows toward portions with low resistance, mainly through a metal foil used as a current collector. The calculation of heat generation in this case indicates that a very high heat generation locally occurs centering a part into which a nail penetrated, as described in FIG. 1.

If heat generation occurs within the battery, the positive and negative electrodes and the electrolyte included in the battery will either react with each other or combust, and eventually the battery will catch fire or explode, since this reaction is a very high exothermic reaction. For this reason, care is required to make sure that rapid heat generation within the battery does not occur.

If the battery is pressed with a heavy object, subjected to strong impact or exposed to high temperature, such a safety problem will also occur. This safety problem will be more serious, as the capacity of lithium secondary batteries increases, leading to an increase in energy density.

Generally, lithium secondary batteries use a lithium-containing transition metal oxide as a positive active material, which is one or more selected from the group consisting of, for example, $LiCoO_2$, $LiNiO_2$, $LiMn_2O_4$, $LiMnO_2$ and $LiNi_{1-x}Co_xO_2$ ($0<X<1$). As a negative active material, carbon, lithium metal or alloy is used, and other metal oxides, such as $TiO_2$ and $SnO_2$, may also be used which can intercalate and deintercalate lithium and have a potential of less than 2V for lithium. Furthermore, as a non-aqueous electrolyte, cyclic and linear carbonates are used. The non-aqueous electrolyte contains a lithium salt selected from the group consisting of, for example $LiClO_4$, $LiCF_3SO_3$, $LiPF_6$, $LiBF_4$, $LiAsF_6$, and $LiN(CF_3SO_2)_2$.

In the lithium secondary battery fabricated as such, the positive or negative electrode and the non-aqueous electrolyte can react with each other at high temperature, particularly in a charged condition, thus causing high reaction heat. A series of exothermic reactions resulting from this heat cause the safety problem.

Although the safety problem in an overcharged state can be solved by the addition of additives to the non-aqueous electrolyte, the battery safety in the above-mentioned conditions, such as nail penetration, pressing, impact and exposure to high temperature, cannot be secured by the addition of additives to the non-aqueous electrolyte.

DISCLOSURE OF THE INVENTION

Therefore, the present invention has been made in view of the above-mentioned problems occurring in the prior art, and it is an object of the present invention to provide a lithium secondary battery whose safety is secured even in conditions, such as nail penetration, pressing, impact and exposure to high temperature.

When a local short circuit occurs in the positive and negative electrodes of a battery due to nail penetration, pressing, impact, exposure to high temperature, etc., to prevent excessive current from flowing locally through a current collector, the present inventors have attempted to disperse the short circuit current toward either the aluminum layer inside a battery package or a metal foil placed outside the battery package, thereby securing the safety of the battery.

For this purpose, the present inventors have attempted to make an electrical connection between the aluminum layer of an aluminum-laminated package and the positive or negative terminal of a battery, in which the aluminum-laminated package is frequently used in lithium secondary batteries, particularly lithium polymer batteries.

Furthermore, the present inventors have attempted to place at least one metal foil with electrical conductivity and/or thermal conductivity, such as aluminum or copper, outside the aluminum-laminated package, and to electrically connect the metal foil to the positive terminal and/or the negative terminal.

In one aspect, the present invention provides a secondary battery comprising a battery package which encloses the outer perimeter of the secondary battery and covers the entire outer surface of positive and negative electrodes and a portion of each terminal of the positive and negative electrodes, wherein the battery package is formed of a laminate film comprising an outer polymer layer, an inner aluminum layer and an adhesive layer formed on a portion of the inner surface of the aluminum layer, the aluminum layer of the battery package being electrically connected with either of the positive and negative terminals.

In another aspect, the present invention provides a battery package formed of a laminate film comprising an outer polymer layer, an inner aluminum layer and an adhesive layer formed on a portion of the inner surface of the aluminum layer, in which a portion of the adhesive layer to be contacted with the positive or negative terminal of the battery is removed and a piece made of an electrically conductive material is inserted into the removed portion.

In still another aspect, the present invention provides a battery package formed of a laminate film comprising an outer polymer layer, an inner aluminum layer and an adhesive layer on a portion of the inner surface of the aluminum layer, in which at least a portion of the outer polymer layer of the package is removed and a piece made of an electrically conductive material is inserted into the removed portion.

In yet another aspect, the present invention provides a secondary battery comprising a battery package which encloses the outer perimeter of the secondary battery and covers the entire outer surface of positive and negative electrodes and a portion of each terminal of the positive and negative electrodes, wherein the battery package is formed of a laminate film comprising an outer polymer layer, an inner aluminum layer and an adhesive layer formed on a portion of the inner surface of the aluminum layer, and further comprises at least one electrically conductive metal foil on at least one of the outer upper and lower surfaces of the battery package, and the electrically conductive metal foil is electrically connected with either of the positive and negative terminals.

In another further aspect, the present invention provides a battery package formed of a laminate film comprising an outer polymer layer, an inner aluminum layer and an adhesive layer on a portion of the inner surface of the aluminum layer, the battery package further comprising at least one electrically conductive metal foil on at least a portion of the upper or lower surface thereof.

According to the present invention, by the electrical connection between the positive or negative terminal and the aluminum layer of the battery package, a short circuit current occurring in conditions, such as nail penetration, pressing, impact and exposure to high temperature, etc., can flow to the aluminum layer of the package so as to inhibit heat generation inside the battery, thus improving the safety of the battery. Alternatively, by the connection between the positive or negative terminal and the electrically conductive metal foil outside the package, the short circuit current occurring in conditions, such as nail penetration, pressing, impact and exposure to high temperature, etc., can flow to the metal foil outside the package so as to inhibit heat generation inside the battery, thus improving the safety of the battery.

BEST MODE FOR CARRYING OUT THE INVENTION

Hereinafter, the present invention will be described in detail.

A secondary battery which can be fabricated according to the present invention is preferably a lithium secondary battery and comprises: a positive electrode capable of intercalating and deintercalating lithium ions; a negative electrode capable of intercalating and deintercalating lithium ions; a porous separator; and an electrolyte.

Figure 1:
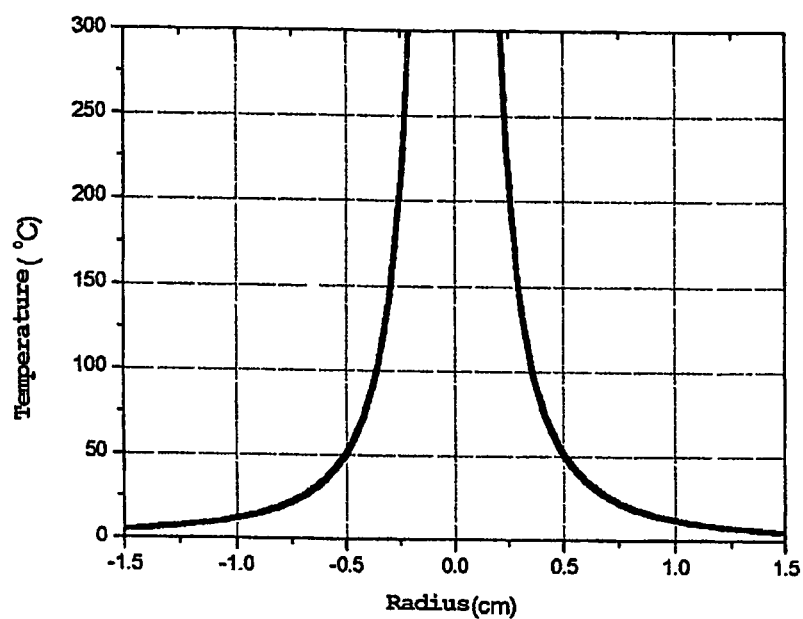
FIG. 1 is a graphic diagram showing a change in temperature around a battery portion penetrated with a nail.
Figure 2:
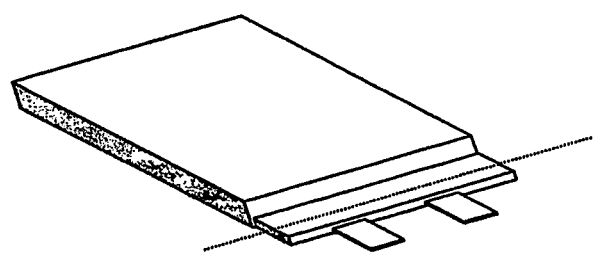
FIG. 2 is a perspective view showing a lithium secondary battery enclosed in a general package.
Figure 3:
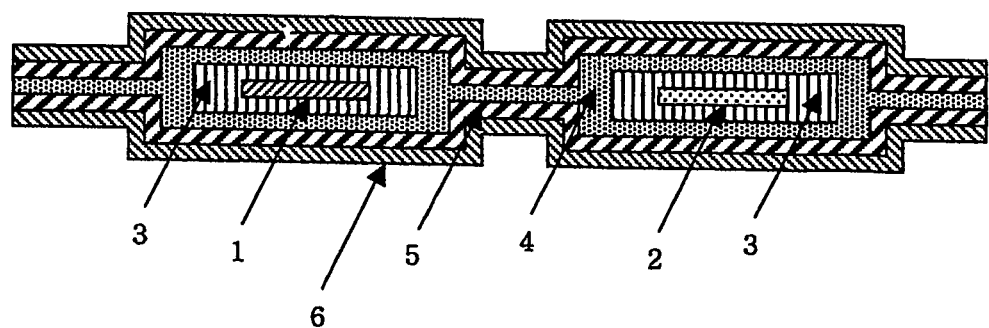
FIG. 3 is a cross-sectional view taken along the dotted line of FIG. 2.

FIG. 2 shows a lithium secondary battery covered by a general package formed of a laminate film comprising an outer polymer layer, an inner aluminum layer and an adhesive layer formed on a portion of the inner surface of the aluminum layer. FIG. 3 is a cross-sectional view taken along the dotted line of FIG. 2, and shows a battery package portion including positive and negative terminals. Referring to FIG. 3, the battery package portion including the positive and negative terminals comprises the inner adhesive layer 4, the intermediate aluminum layer 5 and the outer polymer layer 6. The positive terminal 1 or the negative terminal 2 through the inner adhesive layer is connected to the outside. The terminals may be coated with the terminal film 3.

The terminal film 3 is a special polymer film which is used to enhance the adhesion between the adhesive layer 4 and the terminals 1 and 2. Generally, the adhesive layer has excellent adhesion to itself, but no excellent adhesion to a terminal made of, for example, aluminum, nickel or copper. For this reason, in order to improve the adhesion between the metal terminal and the adhesive layer, it is preferred to use the terminal film.

The terminal film 3 is made of an electrically insulating polymer, and preferably a mixture of polyolefin polymer used in the general adhesive layer with additives.

The adhesive layer 4 serves to adhere both sides of a package to each other, thus preventing external moisture or foreign materials from entering the battery and preventing an electrolyte in the battery from leaking to the outside. It is made of a resin material which has durability against organic substances, such as electrolytes, is thermoplastic for easy adhesion upon thermal bonding and is electrically insulating. An adhesive layer which is currently used is mainly made of polyolefin resin, such as polyolefin, polypropylene or a copolymer thereof.

The aluminum layer 5 serves to the shaping of a package and to prevent the infiltration and leakage of moisture or electrolyte. The aluminum layer is made of aluminum metal with very excellent electrical conductivity and thermal conductivity.

The outermost polymer layer 6 allows the protection and printing of the outer portion of a battery and is made of a material which has no conductivity such that a short circuit does not occur even when two terminals of a battery are in contact with each other. Currently, the polymer layer is made of PET (polyethylene terephthalate) or nylon.

Accordingly, in the battery covered by the general package, the aluminum film of the package and the battery terminal are electrically insulated by the terminal film or the adhesive layer such that current cannot flow therebetween.

One aspect of the present invention is characterized in that, in order to secure the safety of a battery, a connection between the positive terminal 1 and the aluminum layer 5 or between the negative terminal 2 and the aluminum layer 5 is made such that electricity or current can flow between the positive terminal 1 and the aluminum layer 5 or between the negative terminal 2 and the aluminum layer 5.

If the aluminum layer of the package and the positive terminal are electrically connected with each other or the aluminum layer and the negative layer are electrically connected with each other according to the present invention, a short circuit current occurring in conditions such as nail penetration will flow to the aluminum layer of the package to cause heat generation in the package, so that there will be little or no heat generation inside the battery.

However, in normal conditions without special conditions such as nail penetration, no current flows to the aluminum layer since the voltage of the aluminum layer of the package is the same anywhere. Also, even when other terminals are in contact with the outer surface of the package, no current flows in the package since the package is surrounded by the polymer layer with an electrically insulating property. Accordingly, in case of the use of such a package, in a normal condition, no current will flow to the aluminum layer of the package, but in hazardous conditions such as nail penetration, current will flow to the aluminum layer, thereby to inhibit current flow into the battery and to secure the safety of the battery.

The present invention allows current flow between the metal terminal and the aluminum layer of the package by either directly connecting them or indirectly connecting them by an electrically conductive material.

The structure in which the aluminum layer of the battery package is connected directly with either of the two electrode terminals can be provided by one of the following methods: a method of making the connection between the aluminum layer and the terminal by surrounding the outer surface of the battery with the battery package and more strongly pressing and thermally melting a package portion adjacent to the corresponding terminal than that of other portions; a method of making the connection by removing a portion of the adhesive layer 4 of the battery package; if the corresponding terminal is coated with the terminal film 3, a method of making the connection by removing a portion of the terminal film 3; and a method of making the connection by removing a portion of the adhesive layer 4 of the battery package and a portion of the terminal film 3 covering the terminal, which corresponds to the removed portion of the adhesive layer.

If the aluminum layer and the terminal are connected directly with each other, heat generated in the battery can be dispersed through the terminal to the aluminum layer in a normal condition or even in special conditions, since the aluminum layer is made of aluminum metal with very excellent electrical and thermal conductivities.

Meanwhile, the structure in which the aluminum layer of the battery package is connected with either of the two electrode terminals by an electrically conducting material can be provided by the following method: a method of making the connection between the aluminum layer and the terminal by removing the a portion of the adhesive layer of the battery package, which is adjacent to the corresponding terminal, and then inserting a piece made of an electrically conductive material into the removed portion; or a method of making the connection by removing at least a portion of the outer polymer layer of the battery package and inserting an electrically conductive material piece or layer between the removed portion and the corresponding terminal.

Figure 4:
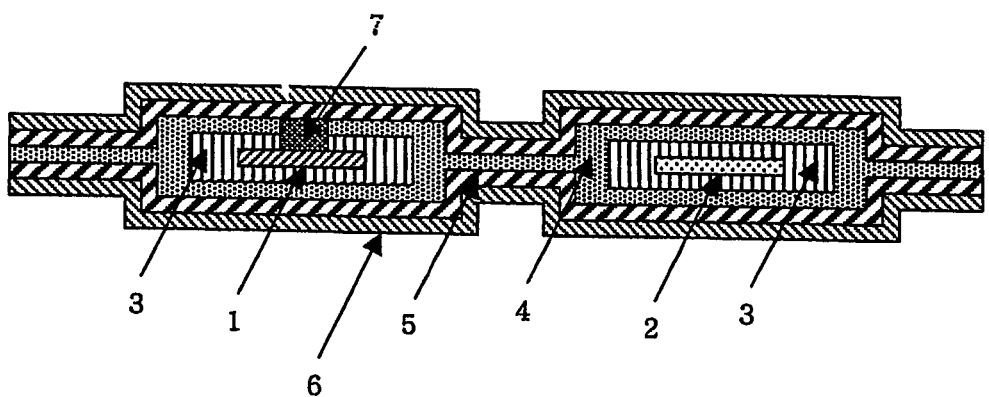
FIG. 4 is a cross-sectional view showing a battery according to one aspect of the present invention, in which a positive terminal is connected with the aluminum layer of a battery package by the insertion of an electrically conductive metal piece into the battery package.
Figure 5:
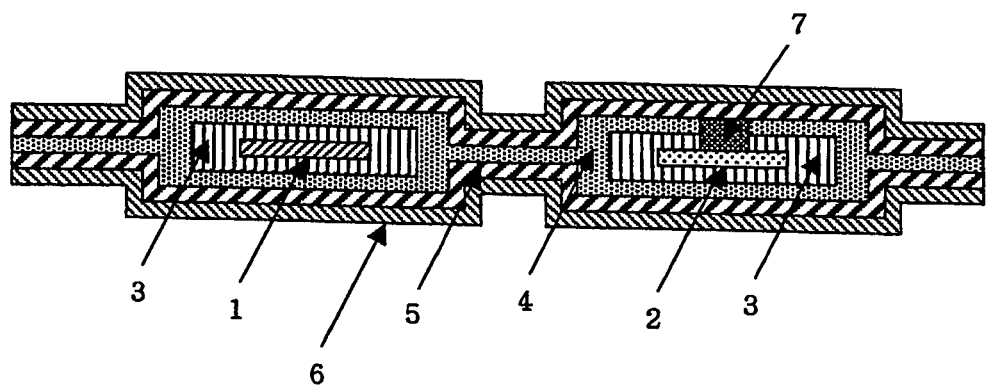
FIG. 5 is a cross-sectional view showing a battery according to one aspect of the present invention, in which a negative terminal is connected with the aluminum layer of a battery package by the insertion of an electrically conductive metal piece into the battery package.

FIGS. 4 and 5 illustrate methods of inserting the electrically conductive material piece 7 into a portion of the adhesive layer adhered to the positive or negative terminal.

FIGS. 6 to 11 illustrate methods of making connection by removing all or a portion of the outer polymer layer of an aluminum-laminated package and then inserting a piece or layer made of an electrically conductive material between the exposed aluminum layer and the positive or negative terminal.

Figure 6:
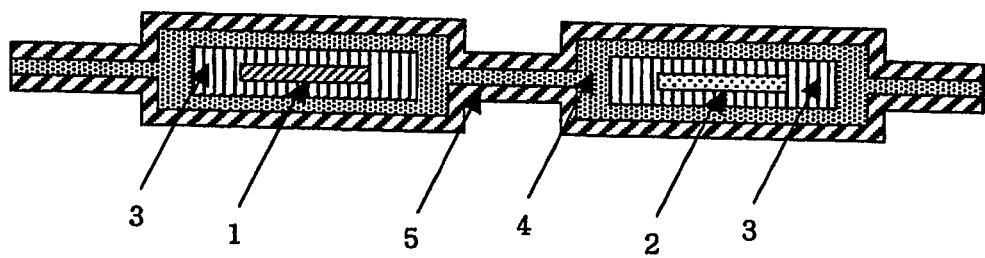
FIG. 6 is a cross-sectional view showing a battery from which the polymer layer 6 of the package in FIG. 3 had been completely removed.
Figure 7:
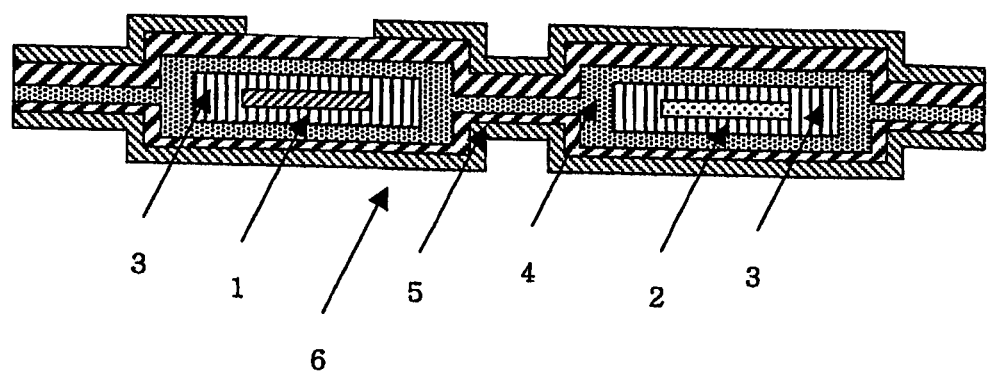
FIG. 7 is a cross-sectional view showing a battery from which a positive terminal-side portion of the polymer layer 6 of the package in FIG. 3 had been removed.
Figure 8:
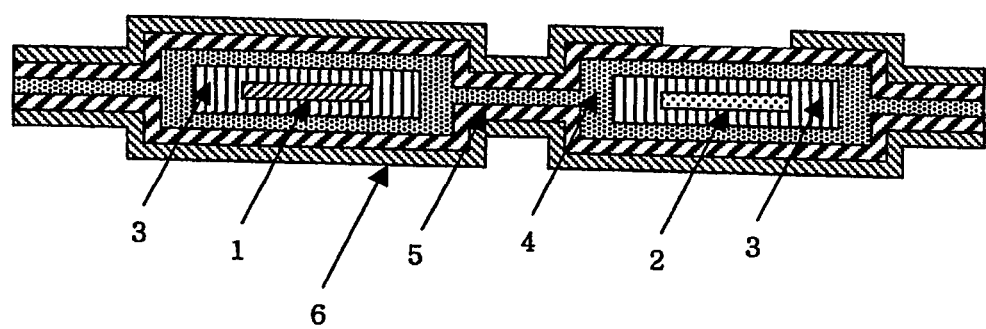
FIG. 8 is a cross-sectional view showing a battery from which a negative terminal-side portion of the polymer layer 6 of the package in FIG. 3 had been removed.

Namely, FIG. 6 shows the entire removal of the polymer layer 6 from the package, and FIGS. 7 and 8 show the partial removal of the polymer layer 6. As the polymer layer of the package is removed as described above, the aluminum layer 5 is exposed to the outside. A piece or layer made of an electrically conductive material is inserted into the exposed portion such that the aluminum layer 5 and the positive terminal 1 or the negative terminal 2 are connected with each other by the electrically conductive material. Methods of connecting metal and metal with each other include arc welding and resistance welding, in which the resistance welding can be used to connect the aluminum layer of the package with the electrically conductive material, and the arc welding can be used to connect the electrically conductive material with the positive or negative terminal.

Figure 9:
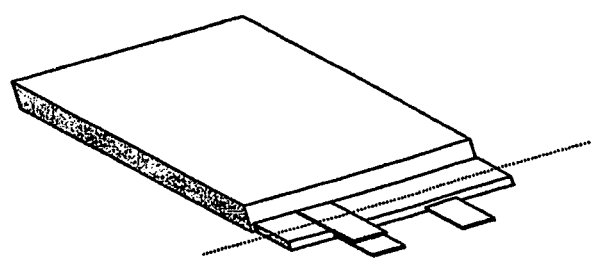
FIG. 9 is a perspective view showing a lithium secondary battery according to one aspect of the present invention, in which the polymer layer of a battery package is removed and the aluminum layer 5 is electrically connected with the positive terminal 1 or the negative terminal 2 by an electrically conductive material placed outside the package.
Figure 10:
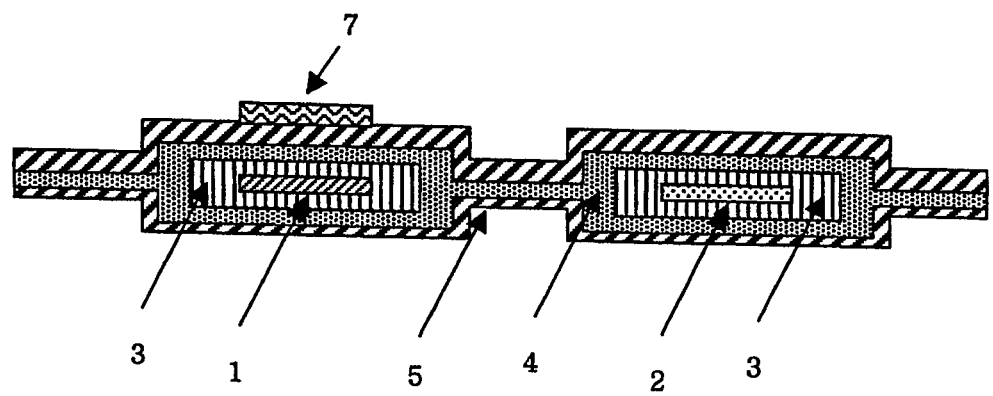
FIG. 10 is an example of a cross-sectional view taken along the dotted line of FIG. 9 and shows a lithium secondary battery according to one aspect of the present invention, in which the polymer layer of a package is entirely removed and the positive terminal 1 is connected with the aluminum layer 5 by an electrically conductive material placed outside the package.
Figure 11:
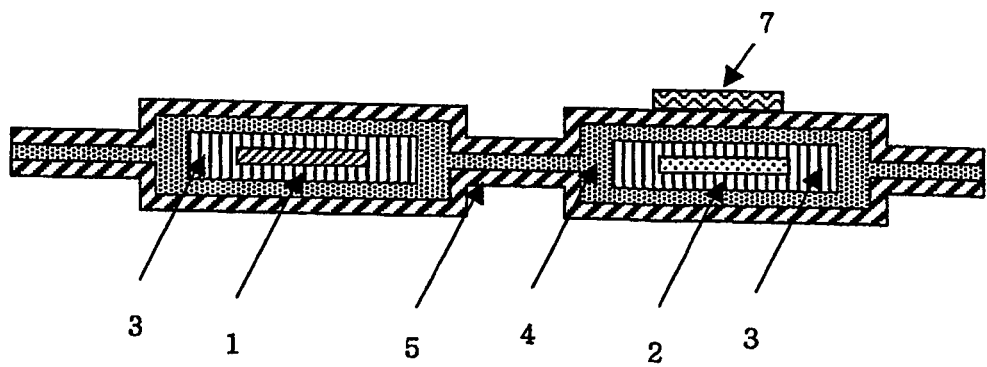
FIG. 11 is an example of a cross-sectional view taken along the dotted line of FIG. 9 and shows a lithium secondary battery according to one aspect of the present invention, in which the polymer layer of a package is entirely removed and the negative terminal 2 is connected with the aluminum layer 5 by an electrically conductive material placed outside the package.

FIG. 9 shows a perspective view of a lithium secondary battery according to an embodiment of the present invention, in which the aluminum layer 5 and the positive terminal 1 or the negative terminal 2 are connected with each other by an electrically conductive material placed outside the battery package, such that current can flow between them. Cross-sectional views taken along the dotted line in FIG. 9 are shown in FIGS. 10 and 11.

Examples of the electrically conductive material, which can be used in the present invention, include all metals with electrical conductivity, such as aluminum metal, copper metal and nickel metal.

It is preferred that the electrically conductive material also has excellent thermal conductivity, in which case heat inside the battery can be dispersed through the terminal and then the thermally conductive material to the aluminum layer in a normal condition or even in a special condition.

Additionally, the terminal can be electrically connected with the aluminum layer of the package by other various methods.

Meanwhile, the connection of the terminal with the aluminum layer of the package provides an advantage in view of space utilization.

Another aspect of the present invention is characterized in that, in order to secure the safety of a battery, at least one electrically conductive and/or thermally conductive metal foil 8 is attached to the outer upper or lower surface of the battery package (FIG. 12) or to both outer surfaces of the battery package (FIG. 13), and is connected with the positive terminal 1, the negative terminal 2 or both the terminals.

If the positive or negative terminal and the metal foil outside the package are connected with each other according to the present invention such that current can flow between them, current occurring in special conditions such as nail penetration will flow to the metal foil to cause heat generation in the metal foil located outside the package, such that there will be little or no heat generation inside the battery.

However, in normal conditions without special conditions such as nail penetration, no current flows to the metal foil since the voltage of the metal foil outside the package is the same anywhere.

Accordingly, in case of the use of such a package, in normal conditions, no current flows to the metal foil outside the package, but in hazardous conditions such as nail penetration, current flows to the metal foil outside the package thereby to inhibit current flow into the battery and to secure the safety of the battery.

The metal foil outside the package may be used in an exposed state and also be surrounded by an electrically insulting polymer layer.

Figure 12:
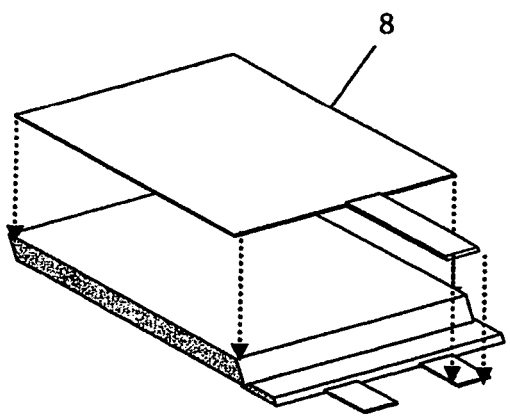
FIG. 12 is a perspective view showing a lithium secondary battery according to one aspect of the present invention, in which a battery terminal is connected with a single metal foil attached outside a package.
Figure 13:
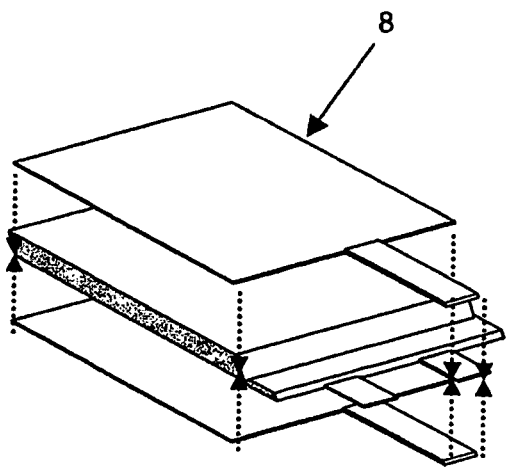
FIG. 13 is a perspective view showing a lithium secondary battery according to one aspect of the present invention, in which two metal foils outside a package are attached to the upper and lower surfaces of the battery, respectively, and connected with a battery terminal.

As shown in FIGS. 12 and 13, the present invention comprises attaching an electrically conductive and/or thermally conductive metal foil to the upper, lower or both surfaces of the battery and connecting the attached metal foil with the positive or negative terminal. Alternatively, if two or more metal foils are used in combination, a method will be used which comprises inserting an electrically non-conductive material like a separator between the metal foils, attaching the metal foils having the separator between them to one or both surfaces of the battery package and connecting the attached metal foils to the positive or negative terminal. In the latter case, the electrically non-conductive material inserted between the metal foils serves to prevent short circuits.

Unlimited examples of a method of connecting the positive or negative terminal with the metal foil outside the package include ultrasonic welding, arc welding and resistance welding. In addition, other various methods may be used to electrically connect the terminal with the metal foil outside the package.

As a material for the electrically conductive metal foil, one selected from all electrically conductive metals, and oxides and alloys thereof, may be used in the present invention. Examples thereof include aluminum metal, copper metal and nickel metal.

If an aluminum foil is used as the metal foil, it will preferably be connected with the positive terminal, and if a copper foil is used as the metal foil, it will preferably be connected with the negative terminal. However, as long as the metal foil has excellent electrical conductivity, it may be connected with the positive or negative terminal regardless of the material of the metal foil.

Moreover, it is preferred that the electrically conductive metal foil also has excellent thermal conductivity, in which case heat inside the battery can be dispersed through the terminal to the thermally conductive metal foil in normal conditions or even in special conditions.

Unlimited examples of the electrically non-conductive material used in the separator inserted between the metal foils include electrically non-conductive polymer materials, such as PP (polypropylene) and PE (polyethylene), as used in a porous separator of batteries.

If the metal foil is attached inside the package, it will be difficult to disperse heat produced in the metal foil to outside. Unlike this, the inventive case where the metal foil is attached outside the package has the advantage of easy heat dispersion. Furthermore, the battery includes a positive electrode material, a negative electrode material, an electrolyte and the like, which are highly unstable to cause rapid chemical reactions upon heating. For this reason, if the metal foil is attached inside the package, heat generation in the metal foil will result in heating of the surrounding positive material, negative material and electrolyte, thus causing rapid chemical reactions, in which case safety problem, such as battery fire or explosion, can occur.

Meanwhile, although the inventive battery package comprises the aluminum layer, a layer made of any material may also be substituted for the aluminum layer as long as it has electrical conductivity and can impart formability to the package. A battery covered with a package comprising such a layer is also within the scope of the present invention.

Examples of batteries to which the present invention can be applied include lithium secondary batteries comprising: (a) a positive electrode capable of intercalating and deintercalating lithium ions; (b) a negative electrode capable of intercalating and deintercalating lithium ions; (c) a porous separator; and (d) a non-aqueous electrolyte containing a lithium salt and an electrolyte compound.

The non-aqueous electrolyte includes cyclic and linear carbonates. Examples of the cyclic carbonate include ethylene carbonate (EC), propylene carbonate (PC), and gamma-butyrolactone (GBL). Examples of the linear carbonate include diethyl carbonate (DEC), dimethyl carbonate (DMC), ethyl methyl carbonate (EMC), methyl propyl carbonate (MPC) and a mixture of two or more thereof.

The lithium salt contained in the non-aqueous electrolyte is preferably selected from the group consisting of $LiClO_4$, $LiCF_3SO_3$, $LiPF_6$, $LiBF_4$, $LiAsF_6$, and $LiN(CF_3SO_2)_2$.

The negative active material used is preferably carbon, lithium metal or alloy. Moreover, other metal oxides such as $TiO_2$ and $SnO_2$ may also be used which can intercalate and deintercalate lithium ions and have a potential of less than 2V for lithium.

Preferred examples of the positive active material include lithium-containing transition metals, such as $LiCoO_2$, $LiNiO_2$, $LiMn_2O_4$, $LiMnO_2$ $LiNi_{1-x}Co_xO_2$ (0<x<1), and a mixture of two or more thereof. Moreover, a positive electrode made of metal oxides, such as $MnO_2$, or a combination thereof, may also be used.

Furthermore, examples of the porous separator include a porous polyolefin separator.

The lithium ion secondary battery according to the present invention can be fabricated by placing the porous separator between the positive and negative electrodes and adding the non-aqueous electrolyte containing a lithium salt, such as $LiPF_6$, and additives, according to a conventional method.

The secondary battery package according to the present invention can be used in pouch-type batteries made of an aluminum-laminated film.

Hereafter, the present invention will be described in detail by the following examples. It is to be understood, however, that these examples are for illustrative purpose only and not intended to limit the scope of the present invention.

Example 1

1M $LiPF_6$ solution having an EC:EMC ratio of 1:2 was used as an electrolyte, artificial graphite as a negative electrode, and $LiCoO_2$ as a positive electrode. Then, a 383562-type lithium polymer battery was fabricated by a conventional method, and enclosed in an aluminum-laminated package. In this packing step, in order to connect the aluminum layer of the package with the positive terminal, a portion of a terminal film covering the positive terminal was removed, after which an aluminum metal piece was inserted into the removed portion and subjected to thermal melting. In this way, a battery was fabricated.

Example 2

A battery was fabricated in the same manner as in Example 1 except that a nickel metal piece was inserted to connect the negative terminal with the aluminum layer of the package.

Example 3

1M $LiPF_6$ solution having an EC:EMC ratio of 1:2 was used as an electrolyte, artificial graphite as a negative electrode, and $LiCoO_2$ as a positive electrode. Then, a 383562-type lithium polymer battery was fabricated by a conventional method, and enclosed in an aluminum-laminated package. In this packing step, a portion of the outer polymer layer of the package was removed to expose the aluminum layer to the outside, after which each of the exposed aluminum layer and the positive terminal was welded to aluminum piece such that they were electrically connected with each other. In this way, a battery was fabricated.

Example 4

A battery was fabricated in the same manner as in Example 3 except that each of the negative terminal and the aluminum layer of the package was welded to aluminum piece such that they were electrically connected with each other.

Example 5

1M $LiPF_6$ solution having an EC:EMC ratio of 1:2 was used as an electrolyte, artificial graphite as a negative electrode, and $LiCoO_2$ as a positive electrode. Then, a 383562-type lithium polymer battery was fabricated by a conventional method, and enclosed in an aluminum-laminated package. In this packing step, each of two aluminum foil was attached to each of both outer surfaces of the package and connected with the positive terminal by ultrasonic welding. In this way, a battery was fabricated.

Example 6

A battery was fabricated in the same manner as in Example 5 except that each of two copper foil was attached to each of both outer surfaces of the package and connected with the negative terminal.

Example 7

A battery was fabricated in the same manner as in Example 5 except that an aluminum foil and a copper foil were attached to each of both outer surfaces of the package and connected with the positive and negative terminals, respectively. At this time, an electrically non-conductive material like a separator was interposed between the two foils to prevent short circuits.

Comparative Example 1

A battery was fabricated in the same manner as in Example 1 except that the aluminum layer of the package was not connected with either of the positive and negative terminals, and also the metal foil was not attached to the outside of the package.

Nail Penetration Test

The batteries fabricated in Examples 1-7 and Comparative Example 1 were provided in a fully charged state. The central portion of the batteries fabricated as described above was penetrated with a 2.5-mm diameter iron nail using a nail penetration tester. Since the safety of the batteries varies depending on the penetration speed of the nail, a device capable of adjusting the penetration speed was used so that the nail could penetrate at various speeds. To examine the safety of the batteries, the test was performed at varying penetration speeds of the nail. The battery of Comparative Example 1 did catch fire even when the nail penetrated at a speed of 1 cm/second, but the batteries of Examples 1-7 did not catch fire even when the nail penetrated at a speed of 10 cm/second.

The results of the nail penetration test are summarized in Table 1 below.

TABLE 1

|  | Penetration speed of nail (cm/sec) | Occurrence of fire | Peak temperature (° C.) |
| --- | --- | --- | --- |
| Comparative Example 1 | 10 | Yes | — |
|  | 1 | Yes | — |
| Example 1 | 10 | No | 78 |
|  | 1 | No | 83 |
| Example 2 | 10 | No | 81 |
|  | 1 | No | 89 |
| Example 3 | 10 | No | 78 |
|  | 1 | No | 83 |
| Example 4 | 10 | No | 81 |
|  | 1 | No | 89 |
| Example 5 | 10 | No |  |
|  | 1 | No |  |
| Example 6 | 10 | No |  |
|  | 1 | No |  |
| Example 7 | 10 | No |  |
|  | 1 | No |  |

The invention claimed is:

1. A secondary battery comprising a battery package which encloses the outer perimeter of the secondary battery and covers the entire outer surface of positive and negative electrodes and a portion of each terminal of the positive and negative electrodes, wherein the battery package is formed of a laminate film comprising an outer polymer layer, an inner electrically conductive aluminum layer, and an adhesive layer formed on a portion of the inner surface of the aluminum layer, the aluminum layer of the battery package being electrically connected with only one of the positive terminal and the negative terminal without passing through the electrode and the aluminum layer being electrically insulated from the other electrode, and the adhesive layer being located between the terminals and the aluminum layer, wherein the positive terminal and the negative terminal are extended outside of a sealing portion of the battery package in a same direction, wherein the positive terminal and the negative terminal are coated with a terminal film, the terminal film being positioned so as to not extend beyond the portion of each terminal of the positive and negative electrode covered by the battery package, and wherein the aluminum layer of the battery package and the positive or negative terminal is connected directly with each other or connected with each other by an electrically conductive material.

2. The secondary battery of claim 1, wherein the direct connection between the aluminum layer and either of the two terminals is made by any one of the following methods: a method of making the connection between the aluminum layer and the terminal by surrounding the outer surface of the battery with the battery package and more strongly pressing and thermally melting a package portion adjacent to the corresponding terminal than that of other portions; a method of making the connection by removing a portion of the adhesive layer of the battery package; if the corresponding terminal is coated with the terminal film, a method of making the connection by removing a portion of the terminal film; and a method of making the connection by removing a portion of the adhesive layer of the battery package and a portion of the terminal film covering the terminal, which corresponds to the removed portion of the adhesive layer.

3. The secondary battery of claim 1, wherein the connection between the aluminum layer and either of the two terminals by the electrically conductive material is made by any one of the following methods: a method of making the connection between the aluminum layer and the terminal by removing the a portion of the adhesive layer of the battery package, which is adjacent to the corresponding terminal, and then inserting a piece made of an electrically conductive material into the removed portion; and a method of making the connection by removing at least a portion of the outer polymer layer of the battery package and inserting an electrically conductive material piece between the removed portion and the corresponding terminal.

4. The secondary battery of claim 1, wherein the electrically conductive material is at least one selected from the group consisting of aluminum, copper and nickel.

5. The secondary battery of claim 1, which is a lithium secondary battery.

6. The secondary battery of claim 1, which further comprises an electrically conductive metal foil on at least one of the outer upper and lower surfaces of the battery package, in which the electrically conductive metal foil is electrically connected with either of the positive and negative terminals.

7. A battery package formed of a laminate film comprising an outer polymer layer, an inner electrically conductive aluminum layer and an adhesive layer formed on a portion of the inner surface of the aluminum layer, the aluminum layer being electrically insulated from a negative or positive electrode, wherein a portion of the adhesive layer that contacts both the aluminum layer and only one of a positive terminal and a negative terminal is removed and a piece made of an electrically conductive material is inserted into the removed portion to form an electrical connection between the aluminum layer and the only one of the positive terminal and the negative terminal, wherein the positive terminal and the negative terminal are extended outside of a sealing portion of the battery package in a same direction, and wherein the positive terminal and the negative terminal are coated with a terminal film, the terminal film being positioned so as to not extend beyond the portion of each terminal of the positive and negative electrode covered by the battery package.

8. A secondary battery comprising a battery package which encloses the outer perimeter of the secondary battery and covers the entire outer surface of positive and negative electrodes and a portion of each terminal of the positive and negative electrodes, wherein the battery package is formed of a laminate film comprising an outer polymer layer and an adhesive layer, and further comprises at least one electrically conductive metal foil on at least one of the outer upper and lower surfaces thereof, the at least one electrically conductive foil being spaced and separate from the portion of each terminal of the positive and negative electrode, and the at least one electrically conductive metal foil is electrically connected with only one of the positive terminal and the negative terminal without passing through the electrode, wherein the positive terminal and the negative terminal are extended outside of a sealing portion of the battery package in a same direction, and wherein the positive terminal and the negative terminal are coated with a terminal film.

9. The secondary battery of claim 8, wherein the metal foil is made of a material selected from the group consisting of electrically conductive metals, and oxides and alloys thereof.

10. The secondary battery of claim 8, wherein the metal foil additionally has thermal conductivity.

11. The secondary battery of claim 8, wherein two or more metal foils are placed on the outer surfaces of the battery package, and a separator made of an electrically non-conductive material is inserted between the metal foils.

12. The secondary battery of claim 8, which is a lithium secondary battery.

13. A battery package formed of a laminate film comprising an outer polymer layer, an inner aluminum layer and an adhesive layer, the battery package further comprising at least one electrically conductive metal foil on at least one of the outer upper and lower surfaces thereof and the at least one electrically conductive metal foil is electrically connected with only one of a positive and a negative terminal without passing through the electrode, wherein the positive terminal and the negative terminal are extended outside of a sealing portion of the battery package in a same direction, and wherein the positive terminal and the negative terminal are coated with a terminal film, the terminal film being positioned so as to not extend beyond the portion of each terminal of the positive and negative electrode covered by the battery package.

14. The secondary battery of claim 1, wherein the aluminum layer of the battery package and the positive or negative terminal are connected directly to each other by the electrically conductive material.

15. The secondary battery of claim 1, wherein the electrically conductive material is separate from the aluminum layer.

* * * * *